(12) United States Patent
Mizumoto et al.

(10) Patent No.: US 9,465,315 B2
(45) Date of Patent: Oct. 11, 2016

(54) SEMICONDUCTIVE ROLLER

(71) Applicant: SUMITOMO RUBBER INDUSTRIES, LTD., Kobe-shi, Hyogo (JP)

(72) Inventors: Yoshihisa Mizumoto, Kobe (JP); Takashi Marui, Kobe (KR); Kenichi Kuroda, Kobe (JP); Akihiko Kawatani, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 526 days.

(21) Appl. No.: 13/956,585

(22) Filed: Aug. 1, 2013

(65) Prior Publication Data

US 2014/0113783 A1   Apr. 24, 2014

(30) Foreign Application Priority Data

Oct. 23, 2012 (JP) .................. 2012-233857

(51) Int. Cl.
| | |
|---|---|
| G03G 15/02 | (2006.01) |
| G03G 15/08 | (2006.01) |
| C08L 9/06 | (2006.01) |
| C08J 3/24 | (2006.01) |

(52) U.S. Cl.
CPC ........... *G03G 15/0818* (2013.01); *C08J 3/246* (2013.01); *C08L 9/06* (2013.01); *G03G 15/0233* (2013.01); *C08J 2309/06* (2013.01); *C08J 2471/03* (2013.01); *C08L 2314/00* (2013.01)

(58) Field of Classification Search
None
See application file for complete search history.

(56) References Cited

U.S. PATENT DOCUMENTS

| | | | |
|---|---|---|---|
| 2006/0269327 A1* | 11/2006 | Mizumoto | ......... G03G 15/0233 399/176 |
| 2007/0041752 A1 | 2/2007 | Mizumoto et al. | |
| 2008/0176992 A1* | 7/2008 | Kim | .......... C08K 3/34 524/554 |
| 2012/0202663 A1 | 8/2012 | Mizumoto et al. | |
| 2014/0023411 A1 | 1/2014 | Kuroda et al. | |

FOREIGN PATENT DOCUMENTS

| | | |
|---|---|---|
| JP | 09-114189 A | 5/1997 |
| JP | 2002-278320 A | 9/2002 |
| JP | 2007-072445 A | 3/2007 |
| JP | 2012-58322 A | 3/2012 |
| JP | 2012-163776 A | 8/2012 |
| JP | 2014-21330 A | 2/2014 |

\* cited by examiner

*Primary Examiner* — Sheeba Ahmed
(74) *Attorney, Agent, or Firm* — Birch, Stewart, Kolasch & Birch, LLP

(57) ABSTRACT

A semiconductive roller is provided which includes a roller body formed from a highly extrudable rubber composition containing an SBR and an epichlorohydrin rubber in combination as a rubber component, the roller body having a higher production yield and higher toner imaging durability, and unlikely to suffer from reduction in image density due to adhesion of toner and a contact mark on an outer peripheral surface thereof with a smaller compression set. In the rubber component, the SBR and the epichlorohydrin rubber are present in an SBR excess state. In the rubber composition, a crosslinking component for crosslinking the rubber component includes a sulfur crosslinking agent and 0.75 to 3 parts by mass of a thiazole accelerating agent based on 100 parts by mass of the rubber component. The roller body (2) of the semiconductive roller (1) is made of a crosslinking product of the rubber composition.

8 Claims, 1 Drawing Sheet

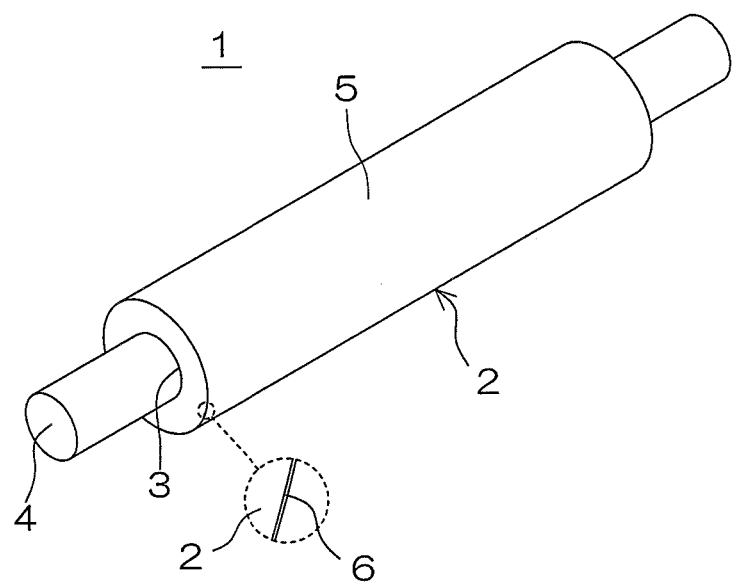

SEMICONDUCTIVE ROLLER

TECHNICAL FIELD

The present invention relates to a semiconductive roller which can be advantageously used as a developing roller, a charging roller or the like, for example, in an electrophotographic image forming apparatus such as a laser printer, an electrostatic copying machine, a plain paper facsimile machine or a printer-copier-facsimile multifunction machine.

BACKGROUND ART

Electrophotographic image forming apparatuses are improved in various ways to meet requirements for higher speed image formation, higher quality image formation, full-color image formation and size reduction.

The key to the improvement is toner. That is, the toner is required to have smaller particle sizes, more uniform particle diameters and more spherical particle shapes in order to satisfy the requirements.

As for the smaller particle sizes, toners having an average particle diameter of not greater than 10 μm, more advantageously, an average particle diameter of not greater than 5 μm, have been developed. As for the more spherical particle shapes, toners having a sphericity of higher than 99% have been developed.

For further higher quality image formation, polymer toners supersede conventional ground toners. The polymer toners are excellent in dot reproducibility in image formation based on digital information and, therefore, advantageous for the higher quality image formation.

The image forming apparatuses employ a charging roller for uniformly electrically charging a surface of a photoreceptor body, and a developing roller for developing an electrostatic latent image formed by exposure of the electrically charged surface of the photoreceptor body into a toner image on the surface of the photoreceptor body.

The developing roller and the charging roller typically each include a roller body made of a crosslinking product of a rubber composition, for example, containing a rubber component and an electron conductivity imparting agent such as an electrically conductive carbon black, and a shaft such as of a metal inserted through a center through-hole of the roller body.

It is effective to use a semiconductive roller having a controlled roller resistance of not greater than $10^8 \Omega$ as the developing roller in order to efficiently develop the electrostatic latent image into the toner image while preventing the toner from adhering to the roller body. In addition, the semiconductive roller can impart the toner with higher electrical chargeability even if the toner is adapted for the smaller particle sizes, the more uniform particle diameters and the more spherical shapes or the polymer toner is used as the toner.

It is also effective to use the semiconductive roller having a controlled roller resistance as the charging roller in order to efficiently electrically charge the surface of the photoreceptor body with lower power consumption.

To meet various requirements imposed on the semiconductive roller, studies have been made on the type of the rubber component and the types and the proportions of additives for the rubber composition and the construction of the semiconductive roller.

For example, the roller body preferably has a nonporous single-layer structure in order to produce the semiconductive roller at higher productivity at lower costs and to improve the durability of the roller body and reduce the compression set of the roller body.

Where the semiconductive roller including the roller body having the nonporous single-layer structure is used as the developing roller, it is contemplated to use an ion conductive rubber such as a chloroprene rubber (CR) or an epichlorohydrin rubber as the rubber component in order to suppress reduction in toner charging amount to ensure higher quality image formation.

Where a semiconductive roller including a roller body made of a crosslinking product of a rubber composition containing the ion conductive rubber is actually used as the developing roller, however, a formed image is liable to have a reduced image density.

In Patent Literature 1, it is proposed that a filler (titanium oxide) having a toner adhesion preventing function is blended in the rubber composition in order to suppress the reduction in image density which may otherwise occur due to the adhesion of the toner to the roller body.

If the filler is blended in an amount sufficient to provide the effect, however, the roller body is liable to have an increased hardness to cause additional problems. More specifically, the roller body is liable to deteriorate the toner to reduce imaging durability, or liable to have a reduced nip width when being in press contact with the surface of the photoreceptor body to reduce the image quality of the formed image.

The term "imaging durability" is defined as an index that indicates how long the image formation quality can be properly maintained when the same toner is repeatedly used for the image formation. A very small part of toner contained in a developing section of the image forming apparatus is used in each image forming cycle, and the remaining major part of the toner is repeatedly circulated in the developing section. Since the developing roller is provided in the developing section and repeatedly brought into contact with the toner, whether or not the developing roller can reduce damage to the toner is a key factor to the improvement of the imaging durability.

If the imaging durability is reduced, a fogging phenomenon is liable to occur in a formed image. The fogging phenomenon is such that the deteriorated toner is spread over the background of the formed image to reduce the image quality.

It is also conceivable to allow the roller body to have a porous structure by blending a foaming agent in the rubber composition to impart the roller body with higher flexibility. However, the porous roller body has a shorter durable service life than the nonporous roller body and, therefore, is liable to suffer from permanent compressive deformation in a shorter period of time, thereby requiring replacement.

Patent Literature 2 proposes a semiconductive roller including a roller body having a double layer structure which includes an electrically conductive elastic layer, and a surface layer provided on an outer peripheral surface of the electrically conductive elastic layer, having a sea-island structure formed from a mixture of an acrylonitrile butadiene rubber (NBR) and a styrene butadiene rubber (SBR) immiscible with each other and containing an ion conductive agent.

Examples of the ion conductive agent include lithium perchlorate, sodium perchlorate, calcium perchlorate and perchlorates of long-chain-alkyl quaternary ammoniums.

Patent Literature 3 proposes a semiconductive roller including a roller body having a double layer structure which includes an elastic layer formed from a mixture of an ethylene propylene diene rubber (EPDM), an NBR and an SBR and containing an electrically conductive carbon black (electrically conductive carbon material), and a surface layer of a fluorine-containing material provided on an outer peripheral surface of the elastic layer.

Where the semiconductive roller is imparted with electron conductivity by using the electrically conductive carbon black alone as the electrically conductive agent, however, the roller resistance can be stabilized only by the layered structure including the surface layer covering the outer peripheral surface. That is, the roller body is not allowed to have a single layer structure, thereby requiring an increased number of production steps and an increased number of materials. Problematically, this correspondingly reduces the productivity of the semiconductive roller and increases the production costs.

Patent Literature 4 proposes a roller body formed from a rubber composition containing at least an SBR and an epichlorohydrin rubber as a rubber component. Patent Literature 4 states that the combinational use of the two types of rubbers provides the following effects:

increasing the toner charging amount when the roller body is used as the charging roller, and improving the toner imaging durability by imparting the roller body with flexibility to provide a proper nip width even if the roller body has a smaller roller diameter, and suppressing the reduction in image density due to the adhesion of the toner to the roller body by reducing the amount of the epichlorohydrin rubber which may cause the adhesion of the toner.

CITATION LIST

Patent Literature

[Patent Literature 1] JP2007-72445A
[Patent Literature 2] JP-HEI9(1997)-114189A
[Patent Literature 3] JP2002-278320A
[Patent Literature 4] JP2012-163776A

SUMMARY OF THE INVENTION

Problem to be Solved by the Invention

The roller body is typically mass-produced through process steps of extruding a rubber composition as a raw material into an elongated tubular body through a die of an extruder, crosslinking a rubber component of the rubber composition, and cutting the tubular body to a predetermined roller body length.

However, the conventional rubber composition prepared by using the SBR and the epichlorohydrin rubber in combination is insufficient in extrudability, failing to ensure smooth extrusion. That is, rubber scorching is liable to occur, making it completely impossible to extrude the rubber composition. Even if the extrusion is possible, the resulting tubular body is liable to have rough outer and inner peripheral surfaces and hence have uneven outer and inner diameters. This may result in reduction in the production yield of the roller body with a greater number of defectives.

The roller body formed from the conventional rubber composition is liable to have a greater compression set. If the semiconductive roller including the roller body is incorporated as a developing roller in an image forming apparatus and the image forming apparatus is not operated for a long period of time with the developing roller kept in press contact with a photoreceptor body, a blade, a toner or the like, the roller body is liable to have a contact mark remaining on the outer peripheral surface thereof. The contact mark influences an image formed immediately after the operation of the image forming apparatus is restarted, preventing proper image formation.

It is an object of the present invention to provide a semiconductive roller which includes a roller body formed from a highly extrudable rubber composition containing an SBR and an epichlorohydrin rubber in combination as a rubber component, the roller body having a higher production yield and higher toner imaging durability, and unlikely to suffer from reduction in image density due to adhesion of toner and a contact mark on an outer peripheral surface thereof with a smaller compression set.

Means for Solving the Problem

The present invention provides a semiconductive roller which includes a roller body made of a crosslinking product of a rubber composition comprising a rubber component including an SBR and an epichlorohydrin rubber, wherein the SBR (S) and the epichlorohydrin rubber (E) are present in the rubber component in a mass ratio satisfying the following expression (1):

$$S>E \tag{1}$$

wherein the rubber composition further comprises a crosslinking component for crosslinking the rubber component, and the crosslinking component includes a sulfur crosslinking agent and not less than 0.75 parts by mass and not greater than 3 parts by mass of a thiazole accelerating agent based on 100 parts by mass of the rubber component.

The SBR has a lower electrical resistivity than other rubbers (e.g., NBR). Where the SBR and the epichlorohydrin rubber are selectively used in combination as the rubber component, therefore, the proportion of the epichlorohydrin rubber can be reduced.

In an SBR excess state satisfying the above expression (1), more specifically, the proportion of the epichlorohydrin rubber is relatively reduced. Where the semiconductive roller is used as a developing roller, for example, it is possible to suppress the reduction in image density which may otherwise occur due to the adhesion of the toner to the roller body in the presence of the epichlorohydrin rubber, while allowing the developing roller to have a proper toner charging amount.

The excess SBR functions to maintain the viscosity of the rubber composition at a lower viscosity level during extrusion of the rubber composition, and to prevent the rubber component from being excessively crosslinked before the extrusion, i.e., during a period from the preparation of the rubber composition to the extrusion. Thus, the excess SBR functions to improve the extrudability of the rubber composition to some extent. Once the crosslinking is started in a crosslinking step after the extrusion, the SBR and the epichlorohydrin rubber of the rubber component effectively mutually promote the crosslinking. Thus, the roller body can be formed as having excellent mechanical properties with a smaller compression set.

The SBR excess state makes it possible to impart the roller body with proper flexibility, thereby improving the toner imaging durability.

The extrudability of the rubber composition is further improved by using the sulfur crosslinking agent and the thiazole accelerating agent in combination as the crosslinking component and by blending the thiazole accelerating agent in the aforementioned proportion.

Where the SBR and the epichlorohydrin rubber are used in combination, the thiazole accelerating agent functions as a retarder to decelerate the crosslinking rather than accelerating the crosslinking before the extrusion. This prevents excess crosslinking of the rubber component before the extrusion, thereby improving the extrudability of the rubber composition.

Particularly, where a thiourea crosslinking agent, a thiuram accelerating agent, a guanidine accelerating agent and/or the like are blended as the crosslinking component, as will be described later, in order to improve the mechanical properties of the roller body (e.g., for reduction of the compression set) or to improve the roller resistance of the semiconductive roller, or where a CR is blended as the rubber component, the crosslinking is liable to proceed before the extrusion. Even in this case, the extrudability can be properly maintained by the function of the thiazole accelerating agent.

Once the crosslinking is started in the crosslinking step after the extrusion, the thiazole accelerating agent functions as an accelerator as originally intended to accelerate the crosslinking reaction of the rubber component with the sulfur crosslinking agent. Thus, the rubber component is effectively crosslinked, so that the roller body can be formed as having excellent mechanical properties with a smaller compression set.

According to the present invention, the tubular body can be formed as having smooth outer and inner peripheral rubber surfaces and stable outer and inner diameters without rubber scorching and irregularities on the outer and inner peripheral surfaces. Thus, the roller body can be produced at an improved production yield.

With a smaller compression set, the roller body is less liable to have a contact mark remaining on the outer peripheral surface thereof after being kept in contact with the photoreceptor body, the blade, the toner or the like. This suppresses the reduction in the image quality of the formed image which may otherwise occur when the formed image is influenced by the contact mark.

In the present invention, the proportions of the SBR and the epichlorohydrin rubber for the rubber component satisfy the expression (1) which defines the SBR excess state. If the proportion of the epichlorohydrin rubber is greater than the proportion of the SBR, the effect of suppressing the reduction in image density which may otherwise occur due to the adhesion of the toner to the roller body in the presence of the epichlorohydrin rubber, the effect of improving the extrudability of the rubber composition and the effect of improving the mechanical properties of the roller body (e.g., reducing the compression set of the roller body) cannot be provided by the combinational use of the SBR and the epichlorohydrin rubber.

The proportion of the thiazole accelerating agent to be blended as the crosslinking component is limited to the aforementioned range for the following reasons.

If the proportion of the thiazole accelerating agent is less than the aforementioned range, the retarder function described above cannot be sufficiently provided, thereby reducing the Mooney scorching time of the rubber composition. This leads to excessive crosslinking of the rubber component before the extrusion to reduce the extrudability of the rubber composition, resulting in reduction in the production yield of the roller body.

Further, it is impossible to sufficiently provide the originally intended accelerator function for assisting the crosslinking reaction caused by the sulfur crosslinking agent once the crosslinking is started in the crosslinking step after the extrusion. This increases the compression set of the roller body, whereby the contact mark is more likely to remain on the roller body to reduce the image quality of the formed image.

If the proportion of the thiazole accelerating agent is greater than the aforementioned range, the excess thiazole accelerating agent is liable to bloom on the outer peripheral surface of the roller body.

Where the proportion of the thiazole accelerating agent is not less than 0.75 parts by mass and not greater than 3 parts by mass based on 100 parts by mass of the rubber component, in contrast, the rubber composition can be properly extruded into the tubular body with improved extrudability as described above and, therefore, the tubular body can be formed as having smooth outer and inner peripheral rubber surfaces and stable outer and inner diameters without rubber scorching and irregularities on the outer and inner peripheral surfaces. This improves the production yield of the roller body.

With a smaller compression set, the roller body is less liable to have a contact mark on the outer peripheral surface thereof, for example, after being kept in contact with the photoreceptor body, the blade, the toner or the like. This suppresses the reduction in the image quality of the formed image which may otherwise occur when the formed image is influenced by the contact mark.

Further, the excess thiazole accelerating agent does not bloom on the outer peripheral surface of the roller body.

The crosslinking component of the rubber composition preferably further contains a thiourea crosslinking agent, a thiuram accelerating agent and a guanidine accelerating agent.

Different types of crosslinking agents and accelerating agents have different crosslinking and accelerating mechanisms for crosslinking the rubber composition and accelerating the crosslinking. In the present invention, the thiourea crosslinking agent, the thiuram accelerating agent and the guanidine accelerating agent are used in combination in addition to the sulfur crosslinking agent and the thiazole accelerating agent. This further reduces the compression set of the roller body, and increases the strength of the roller body.

The rubber component of the rubber composition preferably further includes at least one polar rubber selected from the group consisting of an NBR, a CR, a butadiene rubber (BR) and an acryl rubber (ACM).

The combinational use of the polar rubber makes it possible to finely control the roller resistance of the semiconductive roller and the mechanical properties of the roller body (e.g., for the reduction of the compression set of the roller body).

In order to produce the semiconductive roller at higher productivity at lower costs and to improve the durability of the roller body to reduce the compression set, the roller body is preferably formed in a nonporous single layer structure. In the present invention, therefore, the roller body basically has a nonporous single layer structure. However, the roller body may have an oxide film formed in an outer peripheral surface thereof.

Where the oxide film is formed, the oxide film functions as a dielectric layer to reduce the dielectric dissipation factor of the semiconductive roller. Where the semiconductive roller is used as the developing roller, the oxide layer serves as a lower friction layer to further suppress the adhesion of the toner.

In addition, the oxide film can be easily formed, for example, by irradiation with ultraviolet radiation in an oxidative atmosphere. This suppresses the reduction in the productivity of the semiconductive roller and the increase in the production costs of the semiconductive roller as much as possible.

The semiconductive roller according to the present invention can be used as a developing roller for developing an electrostatic latent image formed on a surface of a photoreceptor body into a toner image with electrically charged toner in an electrophotographic image forming apparatus.

Alternatively, the semiconductive roller can be used as a charging roller for uniformly electrically charging the surface of the photoreceptor body in the image forming apparatus.

Effects of the Invention

The present invention provides a semiconductive roller which includes a roller body formed from a highly extrudable rubber composition containing an SBR and an epichlorohydrin rubber in combination as a rubber component, the roller body having a higher production yield and higher toner imaging durability, and unlikely to suffer from reduction in image density due to adhesion of toner and a contact mark on an outer peripheral surface thereof with a smaller compression set.

BRIEF DESCRIPTION OF THE DRAWING

FIG. 1 is a perspective view illustrating a semiconductive roller according to one embodiment of the present invention.

EMBODIMENTS OF THE INVENTION

A semiconductive roller according to the present invention includes a roller body made of a crosslinking product of a rubber composition containing an SBR and an epichlorohydrin rubber as a rubber component.

In the rubber component, the SBR (S) and the epichlorohydrin rubber (E) are present in a mass ratio satisfying the following expression (1):

$$S>E \qquad (1)$$

The rubber composition further contains a sulfur crosslinking agent and not less than 0.75 parts by mass and not greater than 3 parts by mass of a thiazole accelerating agent based on 100 parts by mass of the rubber component as a crosslinking component for crosslinking the rubber component.
(SBR)

Usable as the SBR are various SBRs synthesized by copolymerizing styrene and 1,3-butadiene by an emulsion polymerization method, a solution polymerization method and other various polymerization methods. The SBRs include those of an oil-extension type having flexibility controlled by addition of an extension oil, and those of a non-oil-extension type containing no extension oil. Either type of SBRs is usable.

According to the styrene content, the SBRs are classified into a higher styrene content type, an intermediate styrene content type and a lower styrene content type, and any of these types of SBRs is usable. Physical properties of the roller body can be controlled by changing the styrene content and the crosslinking degree.

These SBRs may be used either alone or in combination.
(Epichlorohydrin Rubber)

Usable as the epichlorohydrin rubber are various polymers containing epichlorohydrin as a recurring unit.

Examples of the epichlorohydrin rubber include epichlorohydrin homopolymers, epichlorohydrin-ethylene oxide bipolymers, epichlorohydrin-propylene oxide bipolymers, epichlorohydrin-allyl glycidyl ether bipolymers, epichlorohydrin-ethylene oxide-allyl glycidyl ether terpolymers, epichlorohydrin-propylene glycidyl ether terpolymers and epichlorohydrin-ethylene oxide-propylene oxide-allyl glycidyl ether quaterpolymers, which may be used either alone or in combination.

Particularly, the ethylene oxide-containing copolymers are preferred as the epichlorohydrin rubber. These copolymers preferably each have an ethylene oxide content of 30 to 95 mol %, more preferably 55 to 95 mol %, particularly preferably 60 to 80 mol %.

Ethylene oxide functions to reduce the electrical resistivity. If the ethylene oxide content is less than the aforementioned range, the electrical resistivity reducing effect will be reduced. If the ethylene oxide content is greater than the aforementioned range, on the other hand, ethylene oxide is liable to be crystallized, whereby the segment motion of molecular chains is hindered to adversely increase the electrical resistivity. Further, the roller body is liable to have a higher hardness after the crosslinking, and the rubber composition is liable to have a higher viscosity when being heat-melted before the crosslinking.

The epichlorohydrin-ethylene oxide bipolymers (ECO) are preferred as the epichlorohydrin rubber.

The ECO preferably has an ethylene oxide content of 30 to 80 mol %, particularly preferably 50 to 80 mol %, and an epichlorohydrin content of 20 to 70 mol %, particularly preferably 20 to 50 mol %.

The epichlorohydrin-ethylene oxide-allyl glycidyl ether terpolymers (GECO) are also usable as the epichlorohydrin rubber.

The GECO preferably has an ethylene oxide content of 30 to 95 mol %, particularly preferably 60 to 80 mol %. The GECO preferably has an epichlorohydrin content of 4.5 to 65 mol %, particularly preferably 15 to 40 mol %, and an allyl glycidyl ether content of 0.5 to 10 mol %, particularly preferably 2 to 6 mol %.

Examples of the GECO include copolymers of the three comonomers described above in a narrow sense, as well as known modification products obtained by modifying an epichlorohydrin-ethylene oxide copolymer (ECO) with allyl glycidyl ether. In the present invention, any of these copolymers are usable.
(Proportions of SBR and Epichlorohydrin Rubber for Rubber Component)

In the present invention, the SBR (S) and the epichlorohydrin rubber (E) should be blended in an SBR excess state, i.e., in a mass ratio satisfying the following expression (1) for the aforementioned reasons:

$$S>E \qquad (1)$$

As long as the expression (1) is satisfied, specific ranges for the proportions of the SBR and the epichlorohydrin rubber are not particularly limited. For example, the proportion of the SBR to be blended is preferably not less than 50 parts by mass and not greater than 90 parts by mass, particularly preferably not less than 60 parts by mass and not greater than 80 parts by mass, based on 100 parts by mass of the rubber component.

If the proportion of the SBR is less than the aforementioned range, the proportion of the epichlorohydrin rubber is relatively increased. Therefore, the semiconductive roller is liable to suffer from the adhesion of the toner to the roller body when being used as a developing roller, thereby reducing the image density of a formed image. Further, the rubber composition is liable to have lower extrudability, and the roller body is liable to have poorer mechanical properties (e.g., a greater compression set) and higher hardness to reduce the toner imaging durability.

If the proportion of the SBR is greater than the aforementioned range, the proportion of the epichlorohydrin rubber is relatively reduced. Therefore, the semiconductive roller is liable to have a higher roller resistance and, hence, have a reduced toner charging amount when being used as the developing roller.

The proportion of the epichlorohydrin rubber to be blended is not less than 5 parts by mass and not greater than 40 parts by mass, particularly preferably not less than 10 parts by mass and not greater than 30 parts by mass, based on 100 parts by mass of the rubber component.

If the proportion of the epichlorohydrin rubber is less than the aforementioned range, the semiconductive roller is liable to have a higher roller resistance and, hence, have a reduced toner charging amount when being used as the developing roller.

If the proportion of the epichlorohydrin rubber is greater than the aforementioned range, the proportion of the SBR is relatively reduced. Therefore, the semiconductive roller is liable to suffer from the adhesion of the toner to the roller body when being used as the developing roller, thereby reducing the image density of the formed image. Further, the rubber composition is liable to have lower extrudability, and the roller body is liable to have poorer mechanical properties (e.g., a greater compression set) and higher hardness to reduce the toner imaging durability.

(Polar Rubber)

The roller resistance of the semiconductive roller and the mechanical properties of the roller body (e.g., for the reduction of the compression set) can be finely controlled by blending a polar rubber in the rubber composition. Examples of the polar rubber include an NBR, a CR, a BR and an ACM, which may be used either alone or in combination.

The CR is particularly preferred as the polar rubber in order to improve the mechanical properties of the roller body (e.g., for the reduction of the compression set) and the roller resistance of the semiconductive roller. The CR is generally synthesized, for example, by emulsion polymerization of chloroprene, and is classified in a sulfur modification type or a non-sulfur-modification type depending on the type of a molecular weight adjusting agent to be used for the emulsion polymerization.

The sulfur modification type CR is prepared by plasticizing a copolymer of chloroprene and sulfur (molecular weight adjusting agent) with thiuram disulfide or the like to adjust the viscosity of the copolymer to a predetermined viscosity level.

The non-sulfur-modification type CR is classified, for example, in a mercaptan modification type, a xanthogen modification type or the like.

The mercaptan modification type CR is synthesized in substantially the same manner as the sulfur modification type CR, except that an alkyl mercaptan such as n-dodecyl mercaptan, tert-dodecyl mercaptan or octyl mercaptan, for example, is used as the molecular weight adjusting agent. The xanthogen modification type CR is synthesized in substantially the same manner as the sulfur modification type CR, except that an alkyl xanthogen compound is used as the molecular weight adjusting agent.

Further, the CR is classified in a lower crystallization speed type, an intermediate crystallization speed type or a higher crystallization speed type depending on the crystallization speed.

In the present invention, any of these types of CRs may be used. Particularly, CRs of the non-sulfur-modification type and the lower crystallization speed type are preferably used either alone or in combination.

Further, a rubber of a copolymer of chloroprene and other comonomer may be used as the CR. Examples of the other comonomer include 2,3-dichloro-1,3-butadiene, 1-chloro-1,3-butadiene, styrene, acrylonitrile, methacrylonitrile, isoprene, butadiene, acrylic acid, acrylates, methacrylic acid and methacrylates, which may be used either alone or in combination.

In the rubber composition, the polar rubber (P) such as the CR is preferably present in amass ratio satisfying the following expression (2) relative to the SBR (S):

$$S > P \qquad (2)$$

If the expression (2) is not satisfied, the proportion of the SBR is relatively reduced. Therefore, it will be impossible to sufficiently provide the aforementioned effects of the blending of the SBR.

The proportion of the polar rubber to be blended may be set at a proper level within the range satisfying the expression (2) according to an desired roller resistance of the roller body. The proportion of the polar rubber is preferably not less than 1 part by mass and not greater than 30 parts by mass, particularly preferably not less than 5 parts by mass and not greater than 20 parts by mass, based on 100 parts by mass of the rubber component.

If the proportion of the polar rubber is less than the aforementioned range, it will be impossible to sufficiently provide the aforementioned effects of finely controlling the roller resistance of the semiconductive roller and the physical property values (e.g., hardness) of the roller body.

If the proportion of the polar rubber is greater than the aforementioned range, the proportion of the SBR is relatively reduced. Therefore, it will be impossible to sufficiently provide the aforementioned effects of the blending of the SBR. Further, the proportion of the epichlorohydrin rubber is relatively reduced, so that the semiconductive roller is liable to have higher roller resistance and, hence, have a reduced toner charging amount when being used as the developing roller.

(Crosslinking Component)

In the present invention, the sulfur crosslinking agent and not less than 0.75 parts by mass and 3 parts by mass of a thiazole accelerating agent based on 100 parts by mass of the rubber component are used as a crosslinking component for crosslinking the rubber component.

The proportion of the thiazole accelerating agent is limited to the aforementioned range for the aforementioned reasons.

For further improvement of the aforementioned effects provided by defining the proportion of the thiazole accelerating agent, the proportion is more preferably not less than 1 part by mass and not greater than 2 parts by mass, particularly preferably not less than 1.5 parts by mass, based on 100 parts by mass of the rubber component.

Examples of the sulfur crosslinking agent include sulfur powder and organic sulfur-containing compounds. Examples of the organic sulfur-containing compounds include tetramethylthiuram disulfide and N,N-dithiobismorpholine. Sulfur is particularly preferred.

Examples of the thiazole accelerating agent include 2-mercaptobenzothiazole, di-2-benzothiazolyl disulfide, a zinc salt of 2-mercaptobenzothiazole, a cyclohexylamine salt of 2-mercaptobenzothiazole, 2-(N,N-diethylthiocarbamoylthio)benzothiazole and 2-(4'-morpholinodithio)benzothiazole, which may be used either alone or in combination.

The crosslinking component may further include other crosslinking agent, other accelerating agent and/or an acceleration assisting agent.

Examples of the other crosslinking agent include a thiourea crosslinking agent, a triazine derivative crosslinking agent, a peroxide crosslinking agent and various monomers, which may be used either alone or in combination.

Examples of the thiourea crosslinking agent include tetramethylthiourea, trimethylthiourea, ethylene thiourea, and thioureas represented by $(C_nH_{2n+1}NH)_2C=S$ (wherein n is an integer of 1 to 10), which may be used either alone or in combination.

Examples of the peroxide crosslinking agent include benzoyl peroxide and the like.

Particularly, sulfur as the sulfur crosslinking agent is preferably used in combination with the thiourea crosslinking agent in order to further reduce the compression set of the roller body and to increase the strength of the roller body.

Where sulfur is used in combination with the thiourea crosslinking agent, the proportion of sulfur to be blended is preferably not less than 0.1 part by mass and not greater than 5 parts by mass, particularly preferably not less than 0.2 parts by mass and not greater than 2 parts by mass, based on 100 parts by mass of the rubber component.

If the proportion of sulfur is less than the aforementioned range, the rubber composition is liable to entirely have a lower crosslinking speed to require a longer period of time for the crosslinking, thereby reducing the productivity of the semiconductive roller. If the proportion of sulfur is greater than the aforementioned range, the roller body is liable to have a greater compression set after the crosslinking, and excess sulfur is liable to bloom on the outer peripheral surface of the roller body.

Where the proportion of sulfur is within the aforementioned range, in contrast, the rubber composition entirely has a higher crosslinking speed to require a shorter period of time for the crosslinking, thereby improving the productivity of the semiconductive roller without the blooming and the increase in compression set.

The proportion of the thiourea crosslinking agent is preferably not less than 0.0009 moles and not greater than 0.0800 moles, particularly preferably not less than 0.0015 moles and not greater than 0.0400 moles, based on 100 g of the rubber component.

If the proportion of the thiourea crosslinking agent is less than the aforementioned range, it will be difficult to reduce the compression set of the roller body or it will be impossible to sufficiently reduce the roller resistance. If the proportion of the thiourea crosslinking agent is greater than the aforementioned range, on the other hand, the roller body is liable to suffer from the blooming and contamination of a photoreceptor body, or to be poorer in mechanical properties (e.g., breaking elongation).

Where the proportion of the thiourea crosslinking agent is within the aforementioned range, in contrast, the semiconductive roller is substantially free from the blooming and the contamination of the photoreceptor body, and has a lower roller resistance because the molecular motions of the rubbers are not significantly hindered.

As the proportion of the thiourea crosslinking agent is increased within the aforementioned range to increase the crosslinking density, the roller resistance is reduced.

Examples of the other accelerating agent include inorganic accelerating agents such as lime, magnesia (MgO) and litharge (PbO), and organic accelerating agents, which may be used either alone or in combination.

Examples of the organic accelerating agents include: guanidine accelerating agents such as 1,3-di-o-tolylguanidine, 1,3-diphenylguanidine, 1-o-tolylbiguanide and a di-o-tolylguanidine salt of dicatechol borate; sulfenamide accelerating agents such as N-cyclohexyl-2-benzothiazylsulfenamide; and thiuram accelerating agents such as tetramethylthiuram monosulfide, tetramethylthiuram disulfide, tetraethylthiuram disulfide and dipentamethylenethiuram tetrasulfide, which may be used either alone or in combination.

Different types of accelerating agents have different functions and, therefore, are preferably used in combination.

Particularly, the guanidine accelerating agent and the thiuram accelerating agent are preferably used in combination with the thiazole accelerating agent in order to further reduce the compression set of the roller body and increase the strength of the roller body.

The proportions of the two types of accelerating agents to be used in combination may be each properly set, but are preferably not less than 0.1 part by mass and not greater than 5 parts by mass, particularly preferably not less than 0.5 parts by mass and not greater than 2 parts by mass, based on 100 parts by mass of the rubber component.

Examples of the acceleration assisting agent include: metal compounds such as zinc white; fatty acids such as stearic acid, oleic acid and cotton seed fatty acids; and other conventionally known acceleration assisting agents, which may be used either alone or in combination.

The proportion of the acceleration assisting agent is preferably not less than 0.1 part by mass and not greater than 5 parts by mass, particularly preferably not less than 0.5 parts by mass and not greater than 2 parts by mass, based on 100 parts by mass of the rubber component.

(Other Ingredients)

As required, various additives may be added to the rubber composition. Examples of the additives include an acid accepting agent, a plasticizing component (a plasticizing agent, a processing aid and the like), a degradation preventing agent, a filler, an anti-scorching agent, a UV absorbing agent, a lubricant, a pigment, an anti-static agent, a flame retarder, a neutralizing agent, a nucleating agent, a defoaming agent and a co-crosslinking agent.

In the presence of the acid accepting agent, chlorine-containing gases generated from the epichlorohydrin rubber during the crosslinking of the rubber component are prevented from remaining in the roller body. Thus, the acid accepting agent functions to prevent the inhibition of the crosslinking and the contamination of the photoreceptor body, which may otherwise be caused by the chlorine-containing gases.

Any of various substances serving as acid acceptors may be used as the acid accepting agent. Preferred examples of the acid accepting agent include hydrotalcites and Magsarat which are excellent in dispersibility. Particularly, the hydrotalcites are preferred.

Where any of the hydrotalcites is used in combination with magnesium oxide or potassium oxide, a higher acid accepting effect can be provided, thereby more reliably preventing the contamination of the photoreceptor body.

The proportion of the acid accepting agent to be blended is preferably not less than 0.2 parts by mass and not greater than 10 parts by mass, particularly preferably not less than 1 part by mass and not greater than 5 parts by mass, based on 100 parts by mass of the rubber component.

If the proportion of the acid accepting agent is less than the aforementioned range, it will be impossible to sufficiently provide the aforementioned effect of the blending of the acid accepting agent. If the proportion of the acid accepting agent is greater than the aforementioned range, the roller body is liable to have an increased hardness after the crosslinking.

Examples of the plasticizing agent include plasticizers such as dibutyl phthalate (DBP), dioctyl phthalate (DOP) and tricresyl phosphate, and waxes.

Examples of the processing aid include fatty acids such as stearic acid.

The proportion of the plasticizing component to be blended is preferably not greater than 5 parts by mass based on 100 parts by mass of the rubber component. This prevents, for example, the bleeding on the outer peripheral surface of the roller body when an oxide film is formed in the outer peripheral surface as required, and the contamination of the photoreceptor body when the semiconductive roller is mounted in an image forming apparatus or when the image forming apparatus is operated. For this purpose, it is particularly preferred to use a polar wax as the plasticizing component.

Examples of the degradation preventing agent include various anti-aging agents and anti-oxidants.

The anti-oxidants serve to reduce the environmental dependence of the roller resistance of the semiconductive roller and to suppress increase in roller resistance during continuous energization of the semiconductive roller. Examples of the anti-oxidants include nickel diethyldithiocarbamate (NOCRAC (registered trade name) NEC-P available from Ouchi Shinko Chemical Industrial Co., Ltd.) and nickel dibutyldithiocarbamate (NOCRAC NBC available from Ouchi Shinko Chemical Industrial Co., Ltd.)

Where the oxide film is to be formed in the outer peripheral surface of the roller body and any of the anti-oxidants is blended in the rubber composition, the proportion of the anti-oxidant to be blended is properly determined so as to ensure efficient formation of the oxide film.

Examples of the filler include zinc oxide, silica, carbon, carbon black, clay, talc, calcium carbonate, magnesium carbonate, aluminum hydroxide and titanium oxide, which may be used either alone or in combination.

The mechanical strength and the like of the roller body can be improved by blending the filler. Where titanium oxide is blended as the filler, the adhesion of the tonner can be suppressed.

Electrically conductive carbon black may be used as the filler to impart the roller body with electron conductivity.

The proportion of the filler to be blended is preferably not greater than 50 parts by mass, particularly preferably not greater than 10 parts by mass, based on 100 parts by mass of the rubber component, for example, in order to impart the nonporous roller body with proper flexibility.

Examples of the anti-scorching agent include N-cyclohexylthiophthalimide, phthalic anhydride, N-nitrosodiphenylamine and 2,4-diphenyl-4-metyl-1-pentene, which may be used either alone or in combination. Particularly, N-cyclohexylthiophthalimide is preferred.

The proportion of the anti-scorching agent to be blended is preferably not less than 0.1 part by mass and not greater than 5 parts by mass, particularly preferably not greater than 1 part by mass, based on 100 parts by mass of the rubber component.

The co-crosslinking agent serves to crosslink itself as well as the rubber component through a crosslinking reaction to increase the overall molecular weight.

Examples of the co-crosslinking agent include ethylenically unsaturated monomers typified by methacrylates and metal salts of methacrylic acid and acrylic acid, polyfunctional polymers utilizing functional groups of 1,2-polybutadienes, and dioximes, which may be used either alone or in combination.

Examples of the ethylenically unsaturated monomers include:

(a) monocarboxylic acids such as acrylic acid, methacrylic acid and crotonic acid;

(b) dicarboxylic acids such as maleic acid, fumaric acid and itaconic acid;

(c) esters and anhydrides of the unsaturated carboxylic acids (a) and (b);

(d) metal salts of the monomers (a) to (c);

(e) aliphatic conjugated dienes such as 1,3-butadiene, isoprene and 2-chloro-1,3-butadiene;

(f) aromatic vinyl compounds such as styrene, α-methyl styrene, vinyltoluene, ethylvinylbenzene and divinylbenzene;

(g) vinyl compounds such as triallyl isocyanurate, triallyl cyanurate and vinylpyridine each having a hetero ring; and (h) cyanovinyl compounds such as (meth)acrylonitrile and α-chloroacrylonitrile, acrolein, formyl sterol, vinyl methyl ketone, vinyl ethyl ketone and vinyl butyl ketone. These ethylenically unsaturated monomers may be used either alone or in combination.

Monocarboxylic acid esters are preferred as the esters (c) of the unsaturated carboxylic acids.

Specific examples of the monocarboxylic acid esters include:

alkyl (meth)acrylates such as methyl (meth)acrylate, ethyl (meth)acrylate, n-propyl (meth)acrylate, i-propyl (meth)acrylate, n-butyl (meth)acrylate, i-butyl (meth)acrylate, n-pentyl (meth)acrylate, i-pentyl (meth)acrylate, n-hexyl (meth)acrylate, cyclohexyl (meth)acrylate, 2-ethylhexyl (meth)acrylate, octyl (meth)acrylate, i-nonyl (meth)acrylate, tert-butylcyclohexyl (meth)acrylate, decyl (meth)acrylate, dodecyl (meth)acrylate, hydroxymethyl (meth)acrylate and hydroxyethyl (meth)acrylate;

aminoalkyl (meth)acrylates such as aminoethyl (meth)acrylate, dimethylaminoethyl (meth)acrylate and butylaminoethyl (meth)acrylate;

(meth)acrylates such as benzyl (meth)acrylate, benzoyl (meth)acrylate and aryl (meth)acrylates each having an aromatic ring;

(meth)acrylates such as glycidyl (meth)acrylate, methaglycidyl (meth)acrylate and epoxycyclohexyl (meth)acrylate each having an epoxy group;

(meth)acrylates such as N-methylol (meth) acrylamide, γ-(meth)acryloxypropyltrimethoxysilane and tetrahydrofurfuryl methacrylate each having a functional group; and multifunctional (meth)acrylates such as ethylene glycol di(meth)acrylate, trimethylolpropane tri(meth)acrylate, ethylene dimethacrylate (EDMA), polyethylene glycol dimethacrylate and isobutylene ethylene dimethacrylate. These monocarboxylic acid esters may be used either alone or in combination.

The rubber composition containing the ingredients described above can be prepared in a conventional manner.

First, the rubbers for the rubber component are blended in the predetermined proportions, and the resulting rubber component is simply kneaded. After additives other than the crosslinking component are added to and kneaded with the rubber component, the crosslinking component is finally added to and further kneaded with the resulting mixture. Thus, the rubber composition is provided. A kneader, a Banbury mixer, an extruder or the like, for example, is usable for the kneading.

<Semiconductive Roller>

FIG. 1 is a perspective view illustrating a semiconductive roller according to one embodiment of the present invention.

Referring to FIG. 1, the semiconductive roller 1 according to this embodiment includes a tubular roller body 2 made of a crosslinking product of the rubber composition, and a shaft 4 inserted through a center through-hole 3 of the roller body 2.

In order to produce the semiconductive roller 1 at higher productivity at lower costs and to improve the durability of the roller body 2 and reduce the compression set of the roller body 2, it is preferred that the roller body 2 basically has a nonporous single layer structure as shown in FIG. 1.

Alternatively, the roller body 2 may have a double layer structure including an outer layer adjacent to an outer peripheral surface 5, and an inner layer adjacent to the shaft 4 in some case. In this case, at least the outer layer may be formed from the rubber composition.

The shaft 4 is a unitary member made of a metal such as aluminum, an aluminum alloy or a stainless steel. The roller body 2 and the shaft 4 are electrically connected and mechanically fixed to each other, for example, with an electrically conductive adhesive agent and, therefore, are unitarily rotatable.

The roller body 2 may have an oxide film 6 formed in an outer peripheral surface 5 thereof as shown on a larger scale in FIG. 1.

Where the oxide film 6 is formed, the oxide film 6 functions as a dielectric layer to reduce the dielectric dissipation factor of the semiconductive roller 1. Where the semiconductive roller 1 is used as a developing roller, the oxide film functions as a lower friction layer to suppress the adhesion of the toner.

Since the formation of the oxide film 6 is easily achieved, for example, by irradiation with ultraviolet radiation in an oxidative atmosphere, it is possible to suppress the reduction in the productivity of the semiconductive roller 1 and the increase in production costs.

The formation of the oxide film 6 may be obviated.

The semiconductive roller 1 can be produced in a conventional manner by employing the rubber composition containing the aforementioned ingredients.

That is, the rubber composition is heated to be melted while being kneaded by means of an extruder. The melted rubber composition is extruded into an elongated tubular body through a die conformal to the sectional shape (annular sectional shape) of the roller body 2.

Then, the tubular body is cooled to be solidified, and then heated to be vulcanized in a vulcanization can with a temporary vulcanization shaft inserted through a through-hole 3 thereof.

In turn, the resulting tubular body is removed from the temporary shaft, and fitted around a shaft 4 having an outer peripheral surface to which an electrically conductive adhesive agent is applied. Where the adhesive agent is a thermosetting adhesive agent, the thermosetting adhesive agent is thermally cured to electrically connect and mechanically fix the roller body 2 to the shaft 4.

As required, the outer peripheral surface 5 of the roller body 2 is polished to a predetermined surface roughness, and then covered with an oxide film 6. Thus, the semiconductive roller 1 shown in FIG. 1 is produced.

A preferred method for easy and efficient formation of the oxide film 6 is to irradiate the outer peripheral surface 5 of the roller body 2 with the ultraviolet radiation as previously described. That is, the rubber composition forming the outer peripheral surface 5 of the roller body 2 per se is oxidized by the irradiation with the ultraviolet radiation at a predetermined wavelength for a predetermined period, whereby the oxide film 6 is formed in the outer peripheral surface 5.

In addition, the oxide film 6, which is thus formed through the oxidation of the rubber composition forming the outer peripheral surface 5 of the roller body 2 by the irradiation with the ultraviolet radiation, is highly uniform in thickness and surface geometry without problems associated with a coating film formed by application of a conventional coating agent.

The wavelength of the ultraviolet radiation for the irradiation is preferably not less than 100 nm and not greater than 400 nm, particularly preferably not greater than 300 nm, in order to efficiently oxidize the rubber component for the formation of the highly functional oxide film 6. The irradiation period is preferably not shorter than 30 seconds and not longer than 30 minutes, particularly preferably not shorter than 1 minute and not longer than 15 minutes.

However, the oxide film 6 may be formed by other method, or may be obviated.

The semiconductive roller 1 is advantageously usable as a developing roller which is incorporated in an electrophotographic image forming apparatus such as a laser printer for developing an electrostatic latent image formed on a surface of a photoreceptor body into a toner image with electrically charged toner.

In this case, the semiconductive roller 1 is capable of suppressing the reduction in image density which may otherwise occur due to adhesion of the toner to the outer peripheral surface 5 of the roller body 2, while maintaining the toner charging amount at a proper level.

Even if the image forming apparatus is not operated for a long period of time with the semiconductive roller 1 kept in press contact with the photoreceptor body, a blade or the toner, the outer peripheral surface of the roller body 2 is unlikely to suffer from a contact mark with a smaller compression set immediately after the operation of the image forming apparatus is restarted. Therefore, proper image formation can be achieved with no influence of the contact mark on a formed image.

In addition, the roller body 2 is highly flexible to improve the toner imaging durability.

The semiconductive roller 1 is also usable as a charging roller or the like, which is incorporated in the image forming apparatus for uniformly electrically charging the surface of the photoreceptor body.

Where the semiconductive roller 1 is used as the developing roller, for example, the roller body 2 preferably has a thickness of not less than 0.5 mm and not greater than 10 mm, more preferably not less than 1 mm and not greater than 7 mm, particularly preferably not less than 2 mm and not greater than 5 mm, in order to provide a proper nip width while reducing the size and the weight of the developing roller.

The inventive semiconductive roller is advantageously usable as a developing roller, a charging roller or the like in an electrophotographic image forming apparatus such as a laser printer, an electrostatic copying machine, a plain paper facsimile machine or a printer-copier-facsimile multifunction machine, or as a transfer roller, a cleaning roller or the like in the image forming apparatus.

EXAMPLES

Example 1

(Preparation of Rubber Composition)

A rubber component was prepared by blending 70 parts by mass of SBR (JSR1502 available from JSR Co., Ltd.), 20 parts by mass of GECO (EPION (registered trade name) ON301 available from Daiso Co., Ltd. and having a molar ratio of EO/EP/AGE=73/23/4) and 10 parts by mass of CR (SHOPRENE (registered trade name) WRT available from Showa Denko K.K.) In the rubber component, the mass ratio between the SBR (S) and the GECO (E) satisfies the following expression (1):

$$S>E \quad (1)$$

and the mass ratio between the SBR (S) and the CR (P) satisfies the following expression (2):

$$S>P \quad (2)$$

While 100 parts by mass of the rubber component was simply kneaded by a Banbury mixer, ingredients shown below in Table 1 except for a crosslinking component were added to and kneaded with the rubber component. Finally, the crosslinking component was added to and kneaded with the resulting mixture. Thus, a rubber composition was prepared.

TABLE 1

| Ingredients | Parts by mass |
| --- | --- |
| Sulfur crosslinking agent | 1.0 |
| Thiourea crosslinking agent | 0.9 |
| Thiazole accelerating agent | 0.75 |
| Thiuram accelerating agent | 1.0 |
| Guanidine accelerating agent | 0.8 |
| Filler | 5 |
| Acid accepting agent | 3 |

The ingredients shown in Table 1 are as follows:
Sulfur crosslinking agent: Sulfur powder
Thiourea crosslinking agent: Ethylene thiourea (2-mercaptoimidazoline ACCEL (registered trade name) 22-S available from Kawaguchi Chemical Industry Co., Ltd.)
Thiazole accelerating agent: Di-2-benzothiazolyl disulfide (NOCCELER (registered trade name) DM available from Ouchi Shinko Chemical Industrial Co., Ltd.)
Thiuram accelerating agent: Tetramethylthiuram monosulfide (NOCCELER TS available from Ouchi Shinko Chemical Industrial Co., Ltd.)
Guanidine accelerating agent: 1,3-di-o-tolylguanidine (NOCCELER DT available from Ouchi Shinko Chemical Industrial Co., Ltd.)
Filler: Electrically conductive carbon black (DENKA BLACK (registered trade name) available from Denki Kagaku Kogyo K.K.)
Acid accepting agent: Hydrotalcites (DHT-4A (registered trade name) 2 available from Kyowa Chemical industry Co., Ltd.)

The amounts (parts by mass) of the respective ingredients shown in Table 1 are based on 100 parts by mass of the rubber component.

(Production of Semiconductive Roller)

The rubber composition thus prepared was fed into an extruder and then extruded into a tubular body having an outer diameter of 17.0 mm and an inner diameter of 6.2 mm. Then, the tubular body was fitted around a temporary crosslinking shaft having an outer diameter of 7.5 mm, and crosslinked at 160° C. for 1 hour in a vulcanization can.

Subsequently, the tubular body was removed from the temporary shaft, then fitted around a shaft having an outer diameter of 10 mm and an outer peripheral surface to which an electrically conductive thermosetting adhesive agent was applied, and heated to 160° C. in an oven. Thus, the tubular body was fixed to the shaft. Thereafter, opposite end portions of the tubular body were trimmed, and the outer peripheral surface of the tubular body was polished by a traverse polishing process utilizing a cylindrical polisher and then by a mirror polishing process to be thereby finished as having an outer diameter of 16.0 mm (with a tolerance of 0.05). Thus, a roller body combined with the shaft was produced.

The outer peripheral surface of the roller body had a surface roughness Rz of 5±2 μm as measured in conformity with Japanese Industrial Standards JIS B0601-$_{1994}$.

Then, the polished outer peripheral surface of the roller body was rinsed with water, and the roller body was set in a UV irradiation apparatus (PL21-200 available from Sen Lights Corporation) with its outer peripheral surface spaced 10 cm from a UV lamp. Every time the roller body was rotated about the shaft by 90 degrees, the outer peripheral surface of the roller body was irradiated with ultraviolet radiation at wavelengths of 184.9 nm and 253.7 nm for 5 minutes. Thus, an oxide film was formed in the outer peripheral surface of the roller body. In this manner, a developing roller was produced.

Examples 2 to 6 and Comparative Examples 1 to 3

Rubber compositions were prepared in substantially the same manner as in Example 1, except that the proportion of the thiazole accelerating agent was 0.20 parts by mass (Comparative Example 1), 0.50 parts by mass (Comparative Example 2), 1.00 part by mass (Example 2), 1.50 parts by mass (Example 3), 2-00 parts by mass (Example 4), 2.50 parts by mass (Example 5), 3.00 parts by mass (Example 6) and 3.10 parts by mass (Comparative Example 3) based on 100 parts by mass of the rubber component. Then, semiconductive rollers were produced by using the rubber compositions thus prepared.

Example 7

A rubber composition was prepared in substantially the same manner as in Example 1, except that the proportion of the SBR was 80 parts by mass without the CR blended, and the proportions of sulfur powder and the thiazole accelerating agent were 1.6 parts by mass and 1.50 parts by mass, respectively, based on 100 parts by mass of the rubber component. Then, a semiconductive roller was produced by using the rubber composition thus prepared.

<Extrudability Evaluation (1)>

The Mooney viscosity (ML(1+4) at 130° C.) and the Mooney scorch time $t_s$ (min) of each of the rubber compositions prepared in Examples and Comparative Examples were determined at a test temperature of 130° C. by a test method specified in Japanese Industrial Standards JIS K6300-1:2001 "Rubber, unvulcanized—Physical property—Part 1: Determination of Mooney viscosity and prevulcanization characteristics with Mooney viscometer." Based on the Mooney viscosity and the Mooney scorch time, the rubber compositions were each evaluated for extrudability.

The rubber composition can be more easily extruded, as the Mooney viscosity reduces. Further, excess crosslinking of the rubber component before the extrusion can be more reliably prevented, as the Mooney scorch time increases. With a lower Mooney viscosity and a longer scorch time, the rubber composition is rated as having more excellent extrudability.

The rubber compositions were each evaluated based on the Mooney viscosity and the Mooney scorch time on the following criteria:
(Mooney Viscosity)
Good (○): The Mooney viscosity was not greater than 30.
Ordinary level (Δ): The Mooney viscosity was greater than 30 and not greater than 50. Unacceptable (X): The Mooney viscosity was greater than 50.
(Mooney Scorch Time)
Good (○): The Mooney scorch time was not shorter than 6 minutes.
Ordinary level (Δ): The Mooney scorch time was not shorter than 5 minutes and shorter than 6 minutes.
Unacceptable (X): The Mooney scorch time was shorter than 5 minutes.
<Extrudability Evaluation (2)>

The rubber compositions prepared by Examples and Comparative Examples were each extruded into a tubular body as described above, and the tubular body was visually inspected. Then, the rubber compositions were each evaluated for extrudability based on the following criteria:
Excellent (◎): Rubber scorching did not occur and the tubular body had a very smooth rubber surface free from irregularities.
Good (○): Rubber scorching did not occur and the tubular body had a smooth rubber surface free from irregularities.
Unacceptable (X): Rubber scorching did not occur but the tubular body had a rough rubber surface with significant irregularities.
Very bad (XX): Rubber scorching occurred and extrusion was impossible.
<Measurement of Compression Set Percentage>

A large-size test strip specified in Japanese Industrial Standards JIS K6262:2006 "Rubber, vulcanized or thermoplastic—Determination of compression set at ambient, elevated or low temperatures" was prepared from each of the rubber compositions prepared in Examples and Comparative Examples. A compression test was performed on the test strip at a test temperature of 70±1° C. for a test period of 22 hours.

A compression set percentage CS (%) was calculated from the following expression (3):

$$CS = t_0 - t_2/t_0 - t_1 \quad (3)$$

wherein $t_0$ is the thickness of the test strip before the compression, $t_1$ is the thickness of a spacer used for the compression, and $t_2$ is the thickness of the test strip after a lapse of 30 minutes from decompression of the test strip.

The roller bodies made of the crosslinking products of the respective rubber compositions were each evaluated for the compression set based on the following criteria:
Good (○): The compression set percentage was not greater than 10%.
Ordinary level (Δ): The compression set percentage was greater than 10% and not greater than 15%.

Unacceptable (X): The compression set percentage was greater than 15%.
<Measurement of Rubber Hardness>

The Type-A Durometer hardness of the roller body of each of the semiconductive rollers produced in Examples and Comparative Examples was measured at a temperature of 23° C. with a load of 1000 g applied to opposite end portions of the roller body by a measurement method specified in Japanese Industrial Standards JIS K6253-3:2006 "Rubber, vulcanized or thermoplastic—Determination of hardness—Part 3: Durometer method."
<Blooming>

The outer peripheral surface of each of the tubular bodies produced by the extrusion in Examples and Comparative Examples was visually observed before the crosslinking, and the outer peripheral surface of each of the roller bodies produced in Examples and Comparative Examples was visually observed after the crosslinking. In Tables 2 and 3, "YES" indicates that blooming of the crosslinking component or the like was observed before and/or after the crosslinking, and "NO" indicates that the blooming was observed neither before nor after the crosslinking.
<Evaluation for Image Density and Imaging Durability>

The semiconductive rollers produced in Examples and Comparative Examples were each incorporated in a new cartridge instead of an originally incorporated developing roller, and then the cartridge was mounted in a laser printer utilizing a positively-chargeable nonmagnetic single-component toner of grinding type and having a printable A4-size sheet number of about 2600 (as determined and disclosed in conformity with Japanese Industrial Standards JIS X6932: 2008) and a printing speed of 26 ppm.

Immediately after five images were formed at a printing percentage of 5%, a black solid image was formed. The transmission density of the black solid image was measured at five given points on the black solid image by means of a monochrome transmission reflection densitometer (RT120 with a light table LP20 available from TECHKON Co., Ltd.) The measurement values thus obtained were averaged. The semiconductive rollers were each evaluated for the image density based on the following criteria:
Good (○): The transmission density was not less than 1.5.
Unacceptable (X): The transmission density was less than 1.5.

After the measurement of the image density, images were sequentially formed at a printing percentage of 1%. Every 500th formed image was visually inspected for the fogging phenomenon. The inspection was repeated until the fogging phenomenon occurred or a printable sheet number of 2600 was reached. The semiconductive rollers were each evaluated for toner imaging durability based on the following criteria:
Good (○): The fogging phenomenon did not occur during the formation of 2600 images.
Unacceptable (X): The fogging phenomenon occurred during the formation of 2600 images.
<Comprehensive Evaluation>

Based on the results of the respective tests, Examples and Comparative Examples were comprehensively evaluated on the following criteria:
Excellent (◎): The extrudability was excellent (◎), and all the other characteristic properties were good (○) without blooming.
Good (○): The extrudability was excellent (◎), and the other characteristic properties were good (○) or ordinary level (Δ) without blooming.

Ordinary level (Δ): The extrudability was good (◯), and the other characteristic properties were good (◯) or ordinary level (Δ) without blooming.

Unacceptable (X): At least one of the characteristic properties was unacceptable (X) or blooming occurred.

The results are shown in Tables 2 and 3.

TABLE 2

|  |  | Comparative Example 1 | Comparative Example 2 | Example 1 | Example 2 | Example 3 |
|---|---|---|---|---|---|---|
| Parts by mass |  |  |  |  |  |  |
| SBR |  | 70 | 70 | 70 | 70 | 70 |
| GECO |  | 20 | 20 | 20 | 20 | 20 |
| CR |  | 10 | 10 | 10 | 10 | 10 |
| Sulfur crosslinking agent |  | 1.0 | 1.0 | 1.0 | 1.0 | 1.0 |
| Thiazole accelerating agent |  | 0.20 | 0.50 | 0.75 | 1.00 | 1.50 |
| Evaluation |  |  |  |  |  |  |
| Mooney Viscosity | Value | 28.0 | 27.4 | 28.0 | 28.2 | 28.4 |
| (ML(1 + 4) at 130° C.) | Evaluation | ◯ | ◯ | ◯ | ◯ | ◯ |
| Mooney scorch time | Value | 3.9 | 4.9 | 5.3 | 5.5 | 6.0 |
| $t_5$ (min) | Evaluation | X | X | Δ | Δ | ◯ |
| Extrudability |  | X | X | ◯ | ◉ | ◉ |
| Compression set | Value | 13.0 | 11.5 | 10.0 | 8.3 | 8.1 |
| percentage CS (%) | Evaluation | Δ | Δ | ◯ | ◯ | ◯ |
| Type-A durometer hardness |  | 48 | 48 | 48 | 49 | 49 |
| Blooming |  | NO | NO | NO | NO | NO |
| Image density |  | ◯ | ◯ | ◯ | ◯ | ◯ |
| Toner imaging durability |  | ◯ | ◯ | ◯ | ◯ | ◯ |
| Comprehensive evaluation |  | X | X | Δ | ◯ | ◉ |

TABLE 3

|  |  | Example 4 | Example 5 | Example 6 | Example 7 | Comparative Example 3 |
|---|---|---|---|---|---|---|
| Parts by mass |  |  |  |  |  |  |
| SBR |  | 70 | 70 | 70 | 80 | 70 |
| GECO |  | 20 | 20 | 20 | 20 | 20 |
| CR |  | 10 | 10 | 10 | — | 10 |
| Sulfur crosslinking agent |  | 1.0 | 1.0 | 1.0 | 1.6 | 1.0 |
| Thiazole accelerating agent |  | 2.00 | 2.50 | 3.00 | 1.50 | 3.10 |
| Evaluation |  |  |  |  |  |  |
| Mooney Viscosity | Value | 29.0 | 30.5 | 32.0 | 27.4 | 35.0 |
| (ML(1 + 4) at 130° C.) | Evaluation | ◯ | Δ | Δ | ◯ | Δ |
| Mooney scorch time | Value | 6.5 | 6.6 | 6.7 | 5.7 | 6.6 |
| $t_5$ (min) | Evaluation | ◯ | ◯ | ◯ | Δ | ◯ |
| Extrudability |  | ◉ | ◯ | ◯ | ◯ | ◯ |
| Compression set | Value | 7.8 | 7.8 | 7.8 | 9.0 | 10.5 |
| percentage CS (%) | Evaluation | ◯ | ◯ | ◯ | ◯ | Δ |
| Type-A durometer hardness |  | 49 | 49 | 49 | 50 | 50 |
| Blooming |  | NO | NO | NO | NO | YES |
| Image density |  | ◯ | ◯ | ◯ | ◯ | ◯ |
| Toner imaging durability |  | ◯ | ◯ | ◯ | ◯ | ◯ |
| Comprehensive evaluation |  | ◉ | Δ | Δ | Δ | X |

The results for Examples 1 to 7 and Comparative Examples 1 to 3 in Tables 2 and 3 indicate that, where the SBR and the GECO are used in combination as the rubber component in the SBR excess state, it is possible to suppress the reduction in image density due to the adhesion of the tonner to the roller body and to impart the roller body with proper flexibility to improve the toner imaging durability.

However, the results for Comparative Examples 1 and 2 indicate that, if the proportion of the thiazole accelerating agent is less than 0.75 parts by mass based on 100 parts by mass of the rubber component, the extrudability of the rubber composition is reduced to reduce the production yield of the roller body, and the roller body is liable to have an increased compression set to suffer from a contact mark remaining on the outer peripheral surface thereof.

The results for Comparative Example 3 indicate that, if the proportion of the thiazole accelerating agent is greater than 3 parts by mass based on 100 parts by mass of the rubber component, excess thiazole accelerating agent blooms.

In contrast, the results for Examples 1 to 7 indicate that, where the proportion of the thiazole accelerating agent is not less than 0.75 parts by mass and not greater than 3 parts by mass based on 100 parts by mass of the rubber component, it is possible to improve the extrudability of the rubber composition without the blooming to improve the production yield of the roller body and to provide a semiconductive roller including a roller body unlikely to suffer from a contact mark on the outer peripheral surface thereof with a smaller compression set.

The results for Examples 1 to 6 indicate that, in order to further improve these effects, the proportion of the thiazole accelerating agent is preferably not less than 1 part by mass and not greater than 2 parts by mass, particularly preferably not less than 1.5 parts by mass, within the aforementioned range based on 100 parts by mass of the rubber component.

Further, the results for Examples 3 and 7 indicate that the compression set can be reduced by further blending the CR for the rubber component.

This application corresponds to Japanese Patent Application No. 2012-233857 filed in the Japan Patent Office on Oct. 23, 2012, the disclosure of which is incorporated herein by reference in its entirety.

What is claimed is:

1. A semiconductive roller comprising a roller body made of a crosslinking product of a rubber composition, the rubber composition comprising:
   a rubber component consisting of a styrene butadiene rubber, an epichlorohydrin rubber, and a chloroprene rubber; and
   a crosslinking component for crosslinking the rubber component;
   wherein the styrene butadiene rubber is present in the rubber component in a proportion of not less than 50 parts by mass and not greater than 90 parts by mass based on 100 parts by mass of the rubber component,
   wherein the epichlorohydrin rubber is present in a rubber component in a proportion of not less than 5 parts by mass and not greater than 40 parts by mass based on 100 parts by mass of the rubber component,
   wherein the chloroprene rubber is present in the rubber component in a proportion of not greater than 10 parts by mass based on 100 parts by mass of the rubber component,
   wherein the crosslinking component consists of a sulfur crosslinking agent and a thiazole accelerating agent,
   wherein the thiazole accelerating agent is present in the crosslinking component in a proportion of not less than 0.75 parts by mass and not greater than 3 parts by mass based on 100 parts by mass of the rubber component.

2. The semiconductive roller according to claim 1, wherein the epichlorohydrin rubber is an epichlorohydrin-ethylene oxide-allyl glycidyl ether terpolymer (GECO).

3. The semiconductive roller according to claim 2, wherein the GECO has an epichlorohydrin content of 4.5 to 65 mol%, an ethylene oxide content of 30 to 95 mol%, and an allyl glycidyl ether content of 0.5 to 10 mol%.

4. The semiconductive roller according to claim 1, wherein the crosslinking component of the rubber composition further includes a thiourea crosslinking agent, a thiuram accelerating agent and a guanidine accelerating agent.

5. The semiconductive roller according to claim 1, wherein the roller body has an oxide film formed in an outer peripheral surface thereof.

6. The semiconductive roller according to claim 5, which is used as a developing roller in an electrophotographic image forming apparatus.

7. The semiconductive roller according to claim 1, wherein the thiazole accelerating agent is present in the crosslinking component in a proportion of not less than 1 part by mass and not greater than 2 parts by mass based on 100 parts by mass of the rubber component.

8. The semiconductive roller according to claim 1, wherein the thiazole accelerating agent is present in the crosslinking component in a proportion of not less than 1.5 parts by mass and not greater than 2 parts by mass based on 100 parts by mass of the rubber component.

* * * * *

UNITED STATES PATENT AND TRADEMARK OFFICE
CERTIFICATE OF CORRECTION

PATENT NO. : 9,465,315 B2  
APPLICATION NO. : 13/956585  
DATED : October 11, 2016  
INVENTOR(S) : Yoshihisa Mizumoto et al.

Page 1 of 1

It is certified that error appears in the above-identified patent and that said Letters Patent is hereby corrected as shown below:

On the Title Page

At item (72), Inventors, change "Takashi Marui, Kobe (KR)" to --Takashi Marui, Kobe (JP)--.

Signed and Sealed this  
Seventh Day of February, 2017

Michelle K. Lee  
*Director of the United States Patent and Trademark Office*